(12) United States Patent
Lorenz et al.

(10) Patent No.: US 6,554,317 B2
(45) Date of Patent: Apr. 29, 2003

(54) GAS BAG MODULE

(75) Inventors: Christian Lorenz, Leidersbach (DE); Ralph Neupert, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/035,881

(22) Filed: Dec. 26, 2001

(65) Prior Publication Data
US 2002/0084639 A1 Jul. 4, 2002

(30) Foreign Application Priority Data
Dec. 28, 2000 (DE) ..................... 200 22 017 U

(51) Int. Cl.[7] .............................................. B60R 21/16
(52) U.S. Cl. ................. 280/743.1; 280/743.2
(58) Field of Search ............... 280/743.1, 743.2, 280/742

(56) References Cited
U.S. PATENT DOCUMENTS 4,966,389 A * 10/1990 Takada .................... 280/743.2
5,887,894 A * 3/1999 Castagner et al. ........... 280/735
5,927,754 A * 7/1999 Patzelt et al. ............... 280/739
6,254,130 B1 * 7/2001 Jayaraman et al. ......... 280/731

* cited by examiner

Primary Examiner—Paul N. Dickson
Assistant Examiner—Faye M. Fleming
(74) Attorney, Agent, or Firm—Tarolli, Sundheim, Covell & Tummino L.L.P.

(57) ABSTRACT

The invention relates to a gas bag module comprising a gas bag, an outer contour of the gas bag being defined by a gas bag wall which has a front wall for the impact of an occupant and an indentation starting from the front wall. The indentation is formed in that a center portion of the gas bag wall is prevented from freely moving during inflation and is restrained. The gas bag has a ring-shaped chamber to be filled with gas and extends around the indentation. Arranged in the indentation is at least one limiting strap which extends along the indentation and has an end pointing out of the indentation and, related to an inflated condition of the gas bag, is attached to the gas bag wall at least at the end pointing out of the indentation.

10 Claims, 2 Drawing Sheets

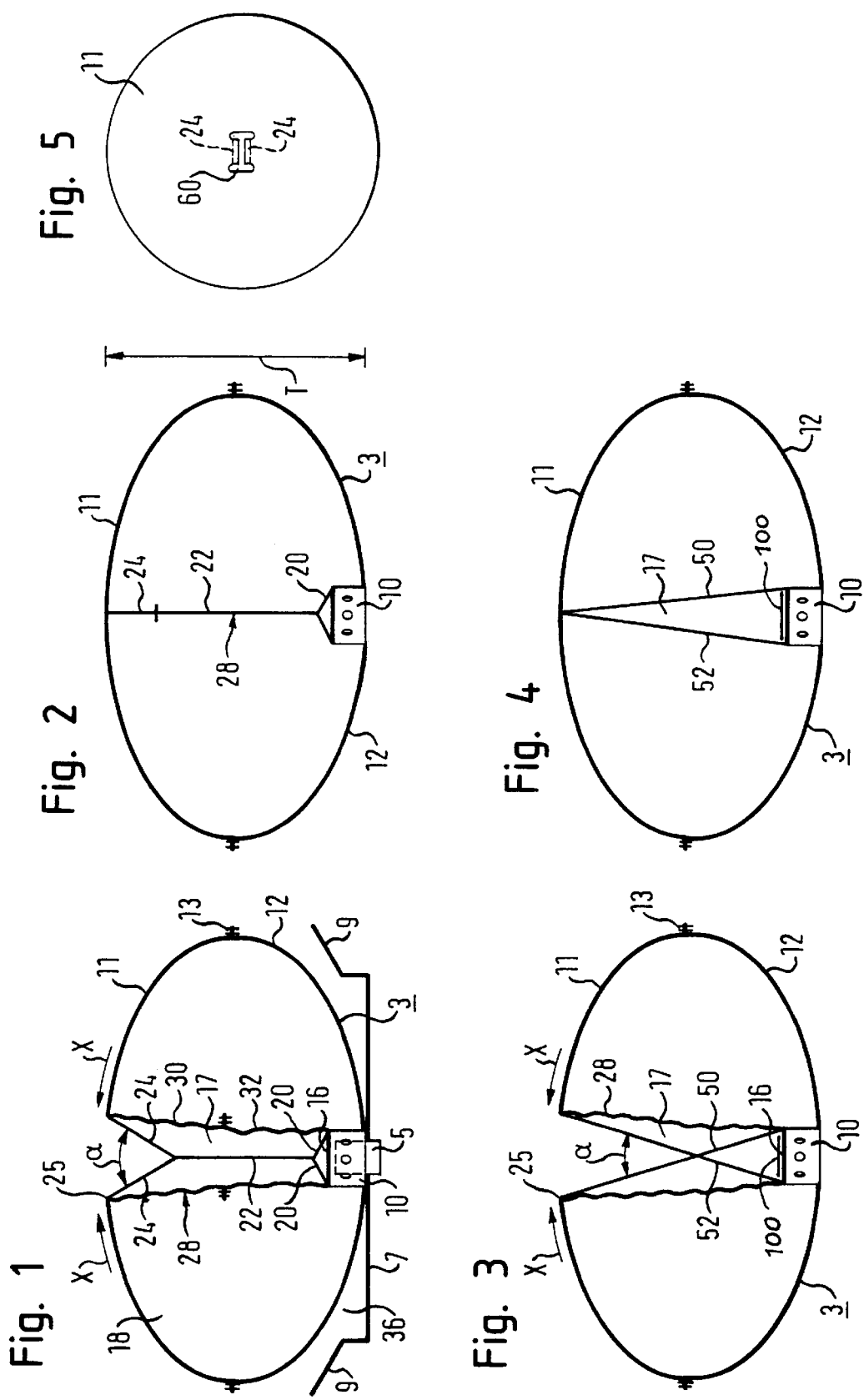

GAS BAG MODULE

This invention relates to a gas bag module comprising a gas bag.

BACKGROUND OF THE INVENTION

Known gas bags have a front wall for the impact of the occupant and an indentation starting from the front wall, which indentation is formed in that a center portion of the gas bag wall is prevented from moving freely during inflation and is restrained, the gas bag having an annular chamber to be filled with gas and provided around the indentation. In such ring-shaped gas bags, the center portion which in a conventional gas bag is presented to the occupant, is prevented from being inflated and from moving towards the occupant in that it remains attached to the module. In this arrangement, restraint is effected via the ring-shaped front wall around the indentation. The indentation is to be as small as possible so as to help the head of the occupant to be intercepted as safe as possible.

BRIEF SUMMARY OF THE INVENTION

The invention provides a gas bag module in which the indentation is closed at least in part, preferably completely. This is achieved in a gas bag module comprising a gas bag, an outer contour of the gas bag being defined by a gas bag wall which has a front wall for the impact of an occupant and an indentation starting from the front wall. The indentation is formed in that a center portion of the gas bag wall is prevented from freely moving during inflation and is restrained. The gas bag has a ring-shaped chamber to be filled with gas and extends around the indentation. Arranged in the indentation is at least one limiting strap which extends along the indentation and has an end pointing out of the indentation and, related to an inflated condition of the gas bag, is attached to the gas bag wall at least at the end pointing out of the indentation. By means of the at least one limiting strap arranged in the indentation, the indentation is preferably completely closed in the region of that end of the limiting strap which points out of the indentation. The gas bag itself preferably is a front gas bag accommodated in the steering wheel or in the dashboard, which front gas bag is inflated in the case of a frontal impact.

In accordance with the preferred embodiment, the limiting strap is attached to the gas bag wall in the region of transition from the front wall to the indentation. Thus, the limiting strap pulls the area of the gas bag wall to which it is attached preferably radially inwards, into the indentation, so that the same is reduced in its cross-section.

Moreover, it is, however, also possible to provide a short limiting strap, so that due to the gas pressure the gas bag wall bulges radially inwards behind the end of the limiting strap pointing outwards or, in other words, collapses radially inwards from all sides, so that in the fully inflated condition an outwardly closed wall is present upon which the occupant can impact.

Preferably, a plurality of limiting straps is provided, which limiting straps extend obliquely, i.e. at an angle in the indentation during inflation and exert a lateral tensile force on the gas bag wall, which causes closure of the indentation.

In this connection it should be emphasized that possibly a complete closure, so that there is no passage at all, is not possible. Therefore, minimum passages from the outside into the indentation may occur.

In the approximately fully inflated condition, i.e. in a not completely inflated condition, the limiting straps extend in a Y-shaped or X-shaped manner, so that the lateral tensile force can be applied. The angle of intersection of the limiting straps with respect to each other is changed in the course of the further inflation in so far as it is reduced up to the fully inflated condition. This means that in the fully inflated condition the limiting straps which for instance extend in an X-shaped manner with respect to each other, are disposed with respect to each other such that they form an inverse "V" in a side view.

In the case of a Y-shaped limiting strap it is provided for that a limiting strap from the module-side end of the indentation, before being attached to the gas bag wall, is divided into several limiting straps, e.g. in that several limiting straps are sewn to the one limiting strap. The several limiting straps preferably rest against each other or almost against each other in the completely inflated condition, when the limiting straps have pulled tight the indentation.

In accordance with the preferred embodiment, the gas bag consists of several fabric parts, one fabric part thereof forming the front wall and having a centric opening for defining the region of transition to the indentation. This opening is preferably slot-shaped, which facilitates the automatic closure of the indentation.

BRIEF DESCRIPTION OF THE DRAWINGS

FIG. 1 shows a cross-sectional view of a gas bag module according to the invention with an almost completely inflated gas bag, FIG. 2 shows a cross-sectional view of the gas bag module as shown in FIG. 1 with completely inflated gas bag, FIG. 3 shows a cross-sectional view of another embodiment, in which the gas bag is not yet completely inflated, FIG. 4 shows a cross-sectional view of the gas bag module as shown in FIG. 3 with completely inflated gas bag, FIG. 5 shows a top view of the gas bags as shown in FIGS. 2 and 4, and FIGS. 6a to 6f show top views of various embodiments of the gas bag of the module according to the invention, with various cuts of the front wall.

DETAILED DESCRIPTION OF THE PREFERRED EMBODIMENTS

Figure 6C:
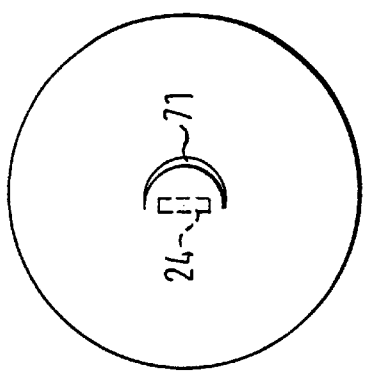

FIG. 1 represents a gas bag module accommodated in the steering wheel, which gas bag module comprises a gas bag 3, a gas generator 5 and a module housing 7 with a module cover 9. The gas generator 5 is surrounded by a pot- or bell-shaped diffuser 10, which has been put over the gas generator 5 from above and is attached to the module, more precisely to the module housing 7. Instead of the diffuser 10 another holding member surrounding the gas generator 5 may, however, also be provided.

The gas bag has a gas bag wall defining the outer contour of the gas bag which wall has several fabric parts. The gas bag has a front wall 11 which faces the occupant in the inflated condition and restrains the same. Moreover, a rear wall 12 is provided. The front wall 11 and the rear wall 12 consist of ring-shaped fabric parts which are connected with each other at a peripheral seam 13. In the middle of the gas bag, i.e. in the center, an indentation 17 open towards the top extends from the front wall 11 towards the gas generator 5. The indentation 17 which is not inflated by gas of the gas generator, is formed in that a portion of the gas bag wall, subsequently referred to as center portion 16, is prevented from an unrestricted, preferably from any kind of movement out of the module in the case of restraint. As a result, a ring-shaped chamber 18 to be inflated and to be filled with gas is obtained.

The module cover has a disk-shaped middle part 100 (see FIGS. 3 and 4), which lies above the center portion 16 and is permanently attached to the diffuser 10 and in contrast to a ring-shaped flap is not even folded to the outside when the module is opened. The center portion 16 is also permanently attached to the diffuser 10 via the attachment of the middle part 100. Alternatively, the diffuser 10 and the middle part 100 might be omitted and the center portion 16 might directly be attached to the gas generator 5.

In the indentation, there is accommodated a limiting strap extending along the indentation 17, to be more precise a limiting strap arrangement. At opposing portions adjacent to the middle part 100, a short limiting strap 20 each is sewn to the center portion 16. The two short limiting straps 20 extend towards each other, and at the junction point a long limiting strap 22 is sewn on, which extends towards the top in the direction out of the indentation 17. Before the transition 25 from the front wall 11 to the indentation 17, the limiting strap 22 is divided once again, to be more precise two short limiting straps 24 are again sewn to the limiting strap 22. The upper ends of the limiting straps 24 are attached to the gas bag wall at the transition 25. Preferably, they are attached to the tubular gas bag wall 28 forming the indentation 17, which tubular gas bag wall consists of two ring-shaped fabric parts 30, 32. The lower end of the fabric part 32 has the center portion 16.

In the not yet completely, but almost completely inflated condition as shown in FIG. 1, the limiting straps have the shape of a double "Y".

The mode of function of the gas bag module as shown in FIG. 1 will be explained below:

During inflation of the gas bag, the same presses open the cover 9, so that the flaps swivel outwards and expose a ring-shaped outlet opening 36, through which the gas bag gets to the outside. The gas bag is deployed further, but as long as it is not completely inflated, it has a wide open indentation 17 on the front wall 11. During inflation, however, the limiting straps 24 extend at an angle in the indentation and thus exert a lateral tensile force, as shown with the arrows X, on the gas bag wall to which they are attached. This tensile force is directed laterally inwards, so that the two points of attachment of the ends of the limiting straps 24 pointing out of the indentation 17 move towards each other. The gas bag wall 28, which defines the indentation, is not tensioned in this condition. The intersection angle α of the limiting straps 24 decreases during inflation. In the completely inflated condition, the two limiting straps 24 rest against each other, since they have closed the indentation, as can be seen in FIG. 2.

In the embodiment represented in FIG. 3, limiting straps 50, 52 are sewn to opposing edges of the center portion 16, which limiting straps extend upwards at an angle and past each other, so that an X-shape is obtained in a side view. In the region of transition 25 from the front wall 11 to the indentation 17, the limiting straps 50, 52 are sewn to the gas bag wall. Due to the fact that the limiting straps 50, 52 extend at an angle in the indentation 17, the above-mentioned lateral tensile force is obtained again in the region of the upper attachment to the gas bag wall. The points of attachment are moved towards each other in the direction of the arrows X, so that during further inflation the opening of the front wall 11 is closed, as can be seen in FIG. 4. With the gas bag completely inflated, the limiting straps 50, 52 have the shape of an inverse "V", when the indentation 17 is pointing upwards.

The gas bag wall 28 which forms the indentation 17, can bulge towards the inside, so that portions of the gas bag wall contact each other, and in part the gas bag wall will rest against the limiting straps 50, 52.

Moreover, in the embodiment as shown in FIG. 2 the fact is that the gas bag wall 28, which defines the indentation 17, can bulge towards the inside to such an extent that the indentation 17 is automatically closed almost along the entire length, as the depth T of the gas bag is defined by the limiting strap arrangement.

In FIGS. 3 and 4, the parts already mentioned in connection with FIGS. 1 and 2, unless they were changed, are provided with the same reference numerals. The module housing was omitted only for reasons of clarity.

The automatic closure as close as possible to the transition 25 from the front wall 11 to the indentation 17 can also be supported in that the fabric part forming the front wall 11 does not have a circular opening, but a slot-shaped opening, as is represented in FIG. 5. In FIG. 5 it is represented that the opening is an H-shaped slot 60, on both sides of the web of the "H" the limiting straps 24 or, alternatively, the straps 50, 52, being sewn on.

Figure 6F:
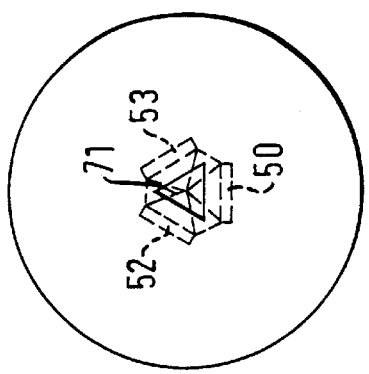

Other cuts of the fabric part forming the front wall 11 also support closing. Examples for such cuts are represented in FIGS. 6a to 6f. In FIG. 6a, a cross-shaped opening is represented, from which the indentation extends to the inside.

Figure 6B:
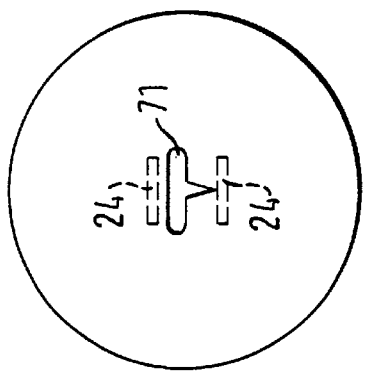

In the embodiment as shown in FIG. 6b, a T-shaped opening 71 is provided.

FIG. 6c shows a C-shaped opening 71, which possibly might even be closed by only one limiting strap 24 extending upwards at an angle.

Figure 6E:
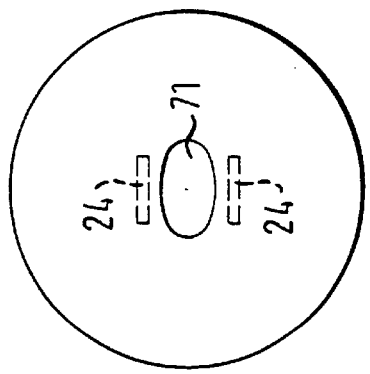
Figure 6A:
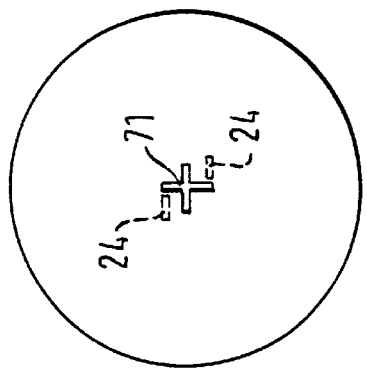
Figure 6D:
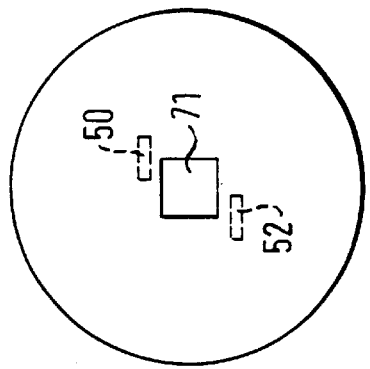

In the embodiment as shown in FIG. 6d, a square opening 71 is provided and it can be seen that the limiting straps 50, 52 are laterally offset from each other, so as to be able to extend past each other.

In the embodiment as shown in FIG. 6e, an oval opening 71 can be seen, and in the embodiment as shown in FIG. 6f a triangular opening 71 with three limiting straps 50, 52, 53. In the region of the center portion 16, the limiting straps are sewn with the center portion 16 by forming a triangle and extend upwards at an angle towards the front wall 11. Assuming that the front wall 11 has a triangular opening 71, the triangle of which, as seen in a top view, lies on the triangle formed by the sewn limiting straps at the center portion 16, the upper end of each limiting strap is arranged at an adjacent leg of the triangle, so that in the inflated condition the limiting straps look like a slightly twisted bundle of limiting straps. During inflation, the opening 71 is then narrowed due to torsion, by the tensile force originating from the limiting straps 50, 52, 53.

What is claimed is:

1. A gas bag module comprising a gas bag, an outer contour of said gas bag being defined by a gas bag wall having an inner surface and an outer surface, said gas bag wall including a front wall for the impact of an occupant, said gas bag having a ring-shaped chamber to be filled with gas, said chamber extending around an indentation, said indentation starting from said front wall and being defined by an outer surface portion of said gas bag wall, said indentation being formed in that a center portion of said bag wall is prevented from freely moving during inflation and is restrained, and within said indentation at least one limiting strap being arranged which extends along said indentation and has an end pointing out of said indentation and, related to an inflated condition of said gas bag, is attached to said outer surface of said gas bag wall at least at said end pointing out of said indentation.

2. The gas bag module as claimed in claim 1, wherein said limiting strap, at said end pointing out of said indentation, is attached to said gas bag wall in a portion of said gas bag wall defining said indentation.

3. The gas bag module as claimed in claim 1, wherein said limiting strap is attached to said gas bag wall in a region of transition from said front wall to said indentation.

4. The gas bag module as claimed in claim 1, wherein several limiting straps are provided which during inflation extend at an angle within said indentation and exert a lateral tensile force on said gas bag wall, said force causing a closure of said indentation.

5. The gas bag module as claimed in claim 4, wherein, as seen in a cross-sectioned view of said gas bag in an-almost completely inflated state, at least some of said several limiting straps extend in a Y-shaped or X-shaped manner, said limiting straps defining an intersection angle which is reduced in the course of further inflation up to a completely inflated condition.

6. The gas bag module as claimed in claim 5, wherein said limiting straps extending in an X-shaped manner cross over each other but are not connected to each other and are attached to opposing edges of said center portion, said limiting straps extend towards said front wall and are attached to said gas bag wall in said region of transition from said front wall to said indentation.

7. The gas bag module as claimed in claim 7, wherein, as seen in a side view with said indentation pointing upwards, said limiting straps form an inverse "V" when said gas bag is completely inflated.

8. A gas bag module comprising a gas bag, an outer contour of said gas bag being defined by a gas bag wall which has a front wall for the impact of an occupant and an indentation starting from said front wall, said indentation being formed in that a center portion of said gas bag wall is prevented from freely moving during inflation and is restrained, said gas bag having a ring-shaped chamber to be filled with gas and extends around said indentation, in said indentation at least one limiting strap being arranged which extends along said indentation and has an end pointing out of said indentation and, related to an inflated condition of said gas bag, is attached to said gas bag wall at least at said end pointing out of said indentation, said at least one limiting strap being divided into several limiting straps before being attached to said gas bag wall.

9. The gas bag module as claimed in claim 8, wherein said several limiting straps rest against each other in said completely inflated condition.

10. A gas bag module comprising a gas bag, an outer contour of said gas bag being defined by a gas bag wall which has a front wall for the impact of an occupant and an indentation starting from said front wall, said indentation being formed in that a center portion of said gas bag wall is prevented from freely moving during inflation and is restrained, said gas bag having a ring-shaped chamber to be filled with gas and extends around said indentation, in said indentation at least one limiting strap being arranged which extends along said indentation and has an end pointing out of said indentation and, related to an inflated condition of said gas bag, is attached to said gas bag wall at least at said end pointing out of said indentation, said gas bag wall consisting of a plurality of fabric parts, one fabric part thereof forming said front wall and having a centric opening for defining said region of transition to said indentation, and said opening being slot-shaped.

* * * * *